(12) United States Patent
Yang et al.

(10) Patent No.: US 6,734,846 B1
(45) Date of Patent: May 11, 2004

(54) DISPLAY DEVICE WITH AUTOMATIC IMAGE CORRECTION FUNCTIONALITY

(75) Inventors: Hsin-Chung Yang, Chung-Li (TW); Yi-Hsiang Kao, Chung-Li (TW)

(73) Assignee: BenQ Corporation, Tao-Yuan Hsien (TW)

( * ) Notice: Subject to any disclaimer, the term of this patent is extended or adjusted under 35 U.S.C. 154(b) by 274 days.

(21) Appl. No.: 09/671,266

(22) Filed: Sep. 28, 2000

(30) Foreign Application Priority Data

Mar. 24, 2000 (TW) ........................................ 89105454 A

(51) Int. Cl.⁷ .................................................. G09G 5/00
(52) U.S. Cl. ........................ 345/213; 345/211; 345/212
(58) Field of Search .............................. 345/211, 212, 345/213, 92, 204, 698, 699

(56) References Cited

U.S. PATENT DOCUMENTS

| | | | | |
|---|---|---|---|---|
| 5,532,719 A | * | 7/1996 | Kikinis ........................ | 345/211 |
| 5,565,897 A | * | 10/1996 | Kikinis et al. ............... | 345/213 |
| 5,821,924 A | * | 10/1998 | Kikinis ........................ | 345/212 |
| 6,297,815 B1 | * | 10/2001 | Byun .......................... | 345/212 |
| 6,392,642 B1 | * | 5/2002 | Wu ............................ | 345/213 |
| 6,407,723 B1 | * | 6/2002 | Okuno et al. ................ | 345/3.2 |
| 6,411,267 B1 | * | 6/2002 | Narui .......................... | 345/10 |

FOREIGN PATENT DOCUMENTS

| | | |
|---|---|---|
| DE | 3915562 C1 | 10/2001 |
| JP | 09098383 A | 4/1997 |
| WO | WO 98/20670 A2 | 5/1998 |

* cited by examiner

*Primary Examiner*—Richard Hjerpe
*Assistant Examiner*—Kimnhung Nguyen
(74) *Attorney, Agent, or Firm*—Winston Hsu

(57) ABSTRACT

A display device has a display screen, a display circuit, an image correction circuit, a timing pulse generator electrically connected to the image correction circuit, and a switch circuit. The switch circuit has a switch electrically positioned between the timing pulse generator and the image correction circuit, and a key electrically connected to the switch for controlling the state of the switch. The switch controls the transmission of a sampling timing pulse from the timing pulse generator to the image correction circuit. When the key is pressed, the switch is activated to permit the sampling timing pulse from the timing pulse generator to transmit to the image correction circuit. The image correction circuit will then perform an automatic image correction to an image frame displayed on the display screen depending on screen frame signals transmitted from a host computer.

5 Claims, 2 Drawing Sheets

DISPLAY DEVICE WITH AUTOMATIC IMAGE CORRECTION FUNCTIONALITY

BACKGROUND OF THE INVENTION

1. Field of the Invention

The present invention relates to a display device with automatic image correction functionality and, more particularly, to a display device with automatic image correction functionality that does not cause electromagnetic wave interference.

2. Description of the Prior Art

Please refer to the U.S. patent application Ser. No. 09/349088, "DISPLAY DEVICE WITH AUTOMATIC RESOLUTION CORRECTION FUNCTIONALITY", which corresponds to the R.O.C. patent application Ser. No. 87,121,366, and the U.S. patent application Ser. No. 09/597746, "DISPLAY DEVICE AND METHOD WITH AUTOMATIC IMAGE HORIZONTAL WIDTH CORRECTION FUNCTIONALITY", which corresponds to the R.O.C. patent application Ser. No. 88,116,536. Both of these two patent applications teach a display device with automatic image correction functionality, with the former being able to automatically correct the image resolution and the latter being able to automatically correct the horizontal width of the image.

In U.S. patent application Ser. No. 09/349088, "DISPLAY DEVICE WITH AUTOMATIC RESOLUTION CORRECTION FUNCTIONALITY", the display device uses a first counting circuit to count the number of active video horizontal synchronization signals between two vertical synchronization signals, i.e. the number of horizontal lines, and uses a second counting circuit to count the number of sampling timing pulses generated by a phase-locked loop when a video active signal occurs between two horizontal synchronization signals, i.e. the horizontal sampling rate. A control circuit is employed to determine from the number of horizontal lines generated by the first counting circuit a corresponding target sampling rate. The phase-locked loop output is then adjusted until the horizontal sampling rate generated by the second counting circuit approaches or reaches the target sampling rate. This, then, completes the functionality of automatically correcting-displayed images.

In U.S. patent application Ser. No. 09/597746, "DISPLAY DEVICE AND METHOD WITH AUTOMATIC IMAGE HORIZONTAL WIDTH CORRECTION FUNCTIONALITY", the display device uses a first timing circuit to measure the time period between two horizontal synchronization signals, and uses a second timing circuit to measure the time period during which the video signal synchronously transmitted from a computer between the two horizontal synchronization signals is active video. A control circuit is further-employed to compute the longest active video time period among all video signals synchronously received between the two horizontal synchronizing signals according to the time period outputs from the first timing circuit and the second timing circuit. This is then used to correct the horizontal width of the video image displayed on a screen so that the horizontal width of the video image is compatible with that of the screen. The display device further comprises a phase-locked loop for generating a sampling timing pulse to count the first timing circuit and the second timing circuit.

In both the U.S. patent application Ser. No. 09/349088, "DISPLAY DEVICE WITH AUTOMATIC RESOLUTION CORRECTION FUNCTIONALITY" and the U.S. patent application Ser. No. 09/597746, "DISPLAY DEVICE AND METHOD WITH AUTOMATIC IMAGE HORIZONTAL WIDTH CORRECTION FUNCTIONALITY", the display devices contain a phase-locked loop to generate the sampling timing pulses needed for counting. The phase-locked loop continuously outputs the sampling timing pulses even when the display device is not performing the automatic image correction functionality, when no sampling timing pulse is needed from the phase-locked loop for counting. These sampling timing pulses are a continuous source of electromagnetic wave interference for other electronic elements in the display device, and affect the normal operation of the display device.

SUMMARY OF THE INVENTION

In view of the foregoing, it is a principal objective of the present invention to provide a display device with automatic image correction functionality that is not a source of electromagnetic wave interference. This display device comprises a switch circuit to control the transmission of the sampling timing pulses so that the sampling timing pulses will be output only when the display device is performing the automatic image correction functionality. This greatly reduces the electromagnetic wave interference caused by the sampling timing pulses.

Briefly, the present invention discloses a display device with automatic image correction functionality. The display device has a display screen, a display circuit, an image correction circuit, a timing pulse generator electrically connected to the image correction circuit, and a switch circuit. The switch circuit has a switch electrically positioned between the timing pulse generator and the image correction circuit, and a key electrically connected to the switch for controlling the state of the switch. The switch controls the transmission of the sampling timing pulse from the timing pulse generator to the image correction circuit. When the key is pressed, the switch is activated to permit the sampling timing pulse from the timing pulse generator to transmit to the image correction circuit. The image correction circuit will then perform an automatic image correction to an image frame displayed on the display screen depending on screen frame signals transmitted from a host computer.

It is an advantage of the present invention that the timing pulses from the timing pulse generator are controlled by the switch. Consequently, the pulses are available only when needed to perform the image correction, and so do not continuously interfere with other circuitry within the display device.

These and other objectives of the present invention will no doubt become obvious to those of ordinary skill in the art after reading the following detailed description of the preferred embodiment, which is illustrated in-the various figures and drawings.

DETAILED DESCRIPTION OF THE INVENTION

Figure 1:
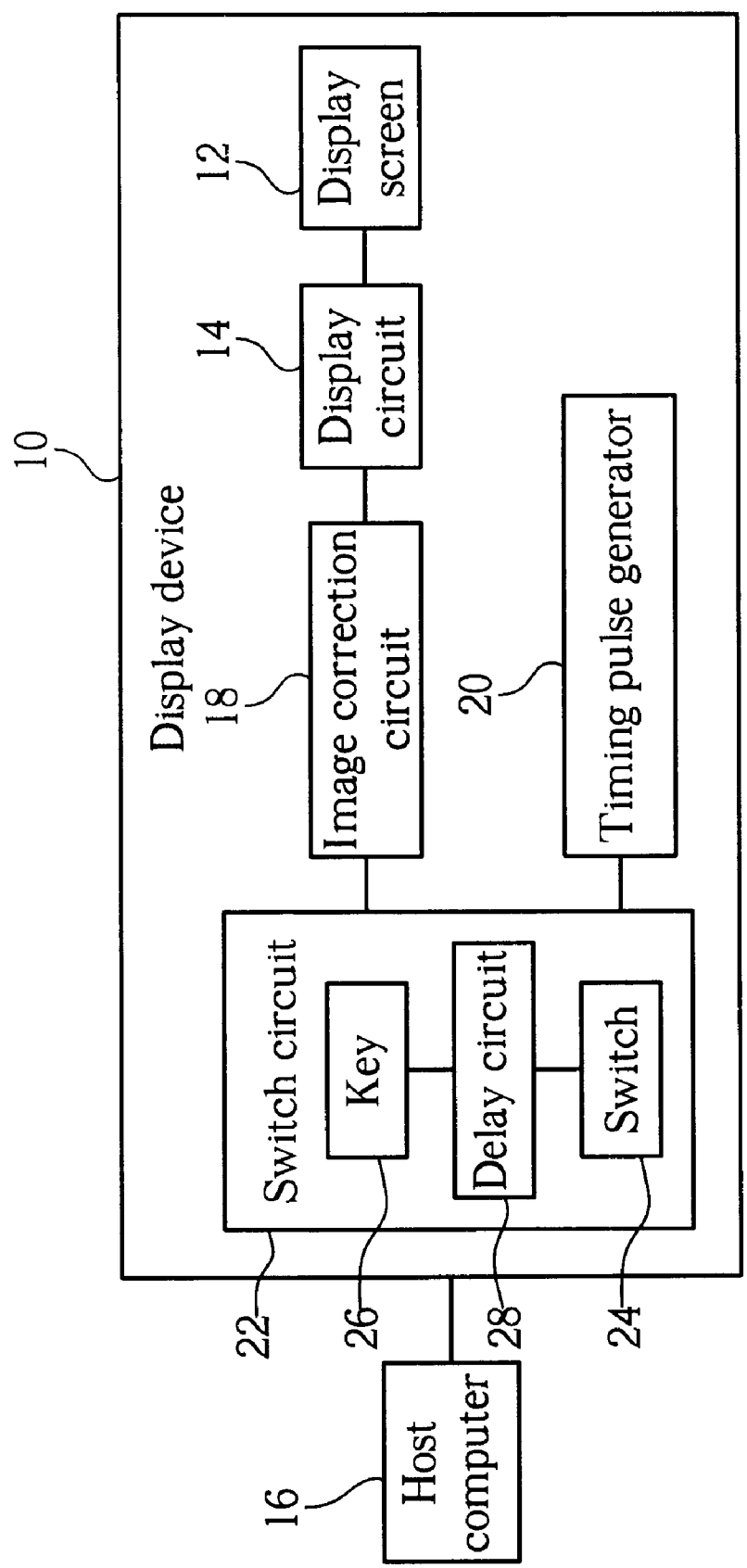
FIG. 1 is a functional block diagram of a display device of the present invention.

Please refer to FIG. 1, which is a functional block diagram of a display device 10 according to the present invention. The display device 10 is a display device with automatic image correction functionality that comprises: a display screen 12; a display circuit 14 for translating an image frame signal transmitted from a host computer 16 into an image frame and displaying the image frame on the display screen 12; an image correction circuit 18 for automatically performing corrections to the image displayed on the display screen 12 depending on a screen frame signal transmitted from the host computer 16; a timing pulse generator 20 electrically connected to the image correction circuit 18 for generating a sampling timing pulse; and a switch circuit 22 electrically positioned between the timing pulse generator 20 and the image correction circuit 18 for controlling the transmission of the sampling timing pulse from the timing pulse generator 20 to the image correction circuit 18. The image frame signal comprises a plurality of vertical synchronization signals, a plurality of horizontal synchronization signals, and a plurality of image signals.

The switch circuit 22 comprises a key 26, a switch 24 for controlling the transmission of the sampling timing pulse generated by the timing pulse generator 20, and a delay circuit 28 electrically connected between the switch 24 and the key 26. When the key 26 is pressed, the display device 10 will perform the automatic image correction functionality.

When the key 26 is pressed, the delay circuit 28 transmits a delay signal for a predetermined length of time to the switch 24, and the switch 24 remains activated for the duration of the delay signal. While the switch 24 is activated, the sampling timing pulse generated by the timing pulse generator 20 is continuously transmitted to the image correction circuit 18. The image correction circuit 18 can then perform the automatic image correction functionality according to the image signal transmitted from the host computer 16.

Figure 2:
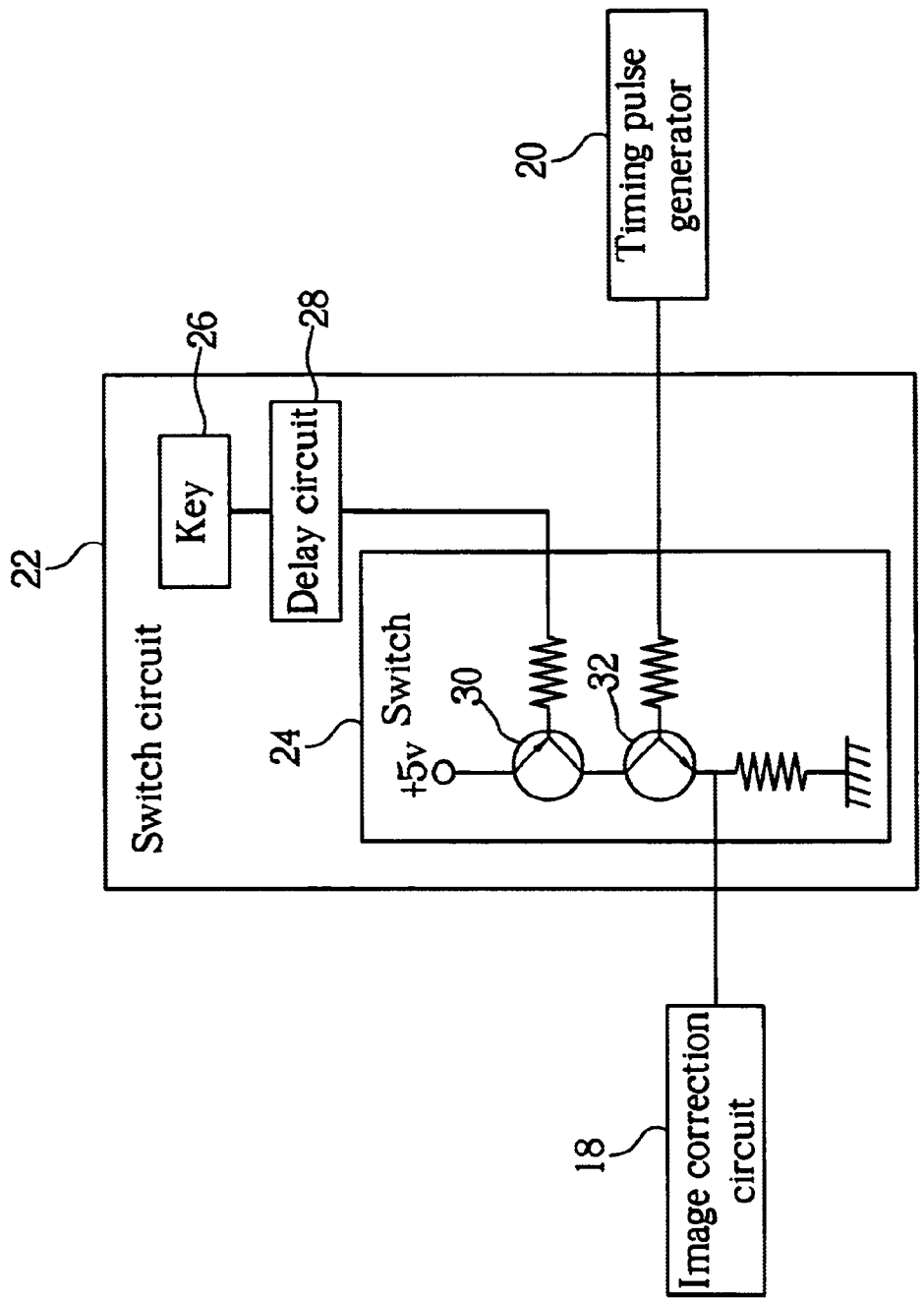
FIG. 2 is a functional block diagram of a switch circuit shown in FIG. 1.

Please refer to FIG. 2, which is a functional block diagram of the switch circuit 22. The switch 24 comprises a first transistor 30 electrically connected to the key 26, and a second transistor 32 electrically connected to the timing pulse generator 20 for receiving the sampling timing pulse generated by the timing pulse generator 20. When the key 26 is pressed, the key 26 is grounded and the base of the first transistor 30 of the switch 24 is at low potential and thus the first transistor 30 turns on, which causes the second transistor 32 to turn on. The sampling timing pulse generated by the timing pulse generator 20 can then pass through the second transistor 32 to transmit to the image correction circuit 18, which can use the sampling timing pulse to perform the automatic image correction functionality.

When the key 26 is not pressed, the base of the first transistor 30 of the switch 24 is at high potential so that the first transistor 30 does not turn on and causes the second transistor 32 of the switch 24 not to turn on. The sampling timing pulse generated by the timing pulse generator 20 cannot pass through the second transistor 32 to transmit to the image correction circuit 18. Thus, the image correction circuit 18 will not perform the automatic image correction functionality.

When the display device 10 is has automatic image resolution correction functionality, the image correction circuit 18 corrects the image resolution shown on the display screen 12 depending upon the number of active video horizontal synchronization signals between two vertical synchronization signals in the image signal, and the active video time period between two horizontal synchronization signals. The timing pulse generator 20 generates the necessary sampling timing pulse for the image correction circuit 18 to compute the active video time period within the image signal.

When the display device 10 has automatic image horizontal width correction functionality, the image correction circuit 18 corrects the video image horizontal width shown on the display screen 12 according to the horizontal synchronization signals in the video image signal and the active video time period. The timing pulse generator 20 generates the necessary sampling timing pulse for the image correction circuit 18 to compute the horizontal synchronization signals and the active video time period.

When compared with the prior art display device with automatic image correction functionality, the display device 10 of the present invention comprises a switch circuit 22 for controlling the transmission of the sampling timing pulse generated by the timing pulse generator 20. Only when the user presses the key 26, and the display device 10 starts to perform the automatic image correction functionality, will the sampling timing pulse generated by the timing pulse generator 20 be transmitted to the image correction circuit 18. Therefore, this invention reduces the electromagnetic wave interference generated by the sampling timing pulse on other electronic elements in the display device 10, minimizing the influence of the sampling timing pulse on the display device 10 as much as possible.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A display device with automatic image correction functionality comprising:

a display screen;

a display circuit for translating an image frame signal transmitted from a host computer into an image frame and displaying the image frame on the display screen, the image frame signal comprising a plurality of vertical synchronizing signals, a plurality of horizontal synchronizing signals, and a plurality of image signals;

an image correction circuit for automatically performing corrections to the image displayed on the display screen depending on a screen frame signal transmitted from the host computer;

a timing pulse generator electrically connected to the image correction circuit, the timing pulse generator generating a sampling timing pulse; and a switch circuit comprising:

a switch electrically positioned between the timing pulse generator and the image correction circuit, the switch controlling the transmission of the sampling timing pulse from the timing pulse generator to the image correction circuit; and a key electrically connected to the switch for controlling the state of the switch;

wherein when the key is pressed, the switch is activated to permit the sampling timing pulse from the timing pulse generator to transmit to the image correction circuit, and the image correction circuit will perform an automatic image correction to the image frame displayed on the display screen depending on the screen frame signals transmitted from the host computer.

2. The display device of claim 1 wherein the image correction circuit can correct the resolution of the image frame shown on the display screen based on the number of horizontal synchronizing signals between two vertical synchronizing signals in the image frame signal, and on the period of time between two horizontal synchronizing signals, the period of time being calculated by the image correction circuit based upon the sampling timing pulse generated by the timing pulse generator.

3. The display device of claim 1 wherein the image correction circuit can correct the horizontal width of the image frame shown on the display screen based on the timing of the horizontal synchronizing signals and the image signals in the image frame signal, and the timing is calculated by the image correction circuit based upon the sampling timing pulse generated by the timing pulse generator.

4. The display device of claim 1 wherein the switch circuit further comprises a delay circuit electrically connected between the switch and the key, the delay circuit transmitting a delay signal of a predetermined length to the switch after the key is pressed, and the switch will remain activated for the duration of the delay signal.

5. The display device of claim 1 wherein the switch comprises:
 a first transistor electrically connected to the key; and
 a second transistor electrically connected to the timing pulse generator;
 wherein when the key is pressed, the first transistor turns on and causes the second transistor to turn on, and the sampling timing pulse can then pass through the second transistor to transmit to the image correction circuit.

\* \* \* \* \*